(12) United States Patent
Araki et al.

(10) Patent No.: US 6,875,806 B2
(45) Date of Patent: Apr. 5, 2005

(54) ROOM TEMPERATURE CURABLE ORGANOPOLYSILOXANE COMPOSITION AND PART USING THE SAME AS ADHESIVE

(75) Inventors: Tadashi Araki, Usui-gun (JP); Takafumi Sakamoto, Usui-gun (JP); Tsuneo Kimura, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/429,745

(22) Filed: May 6, 2003

(65) Prior Publication Data

US 2003/0211339 A1 Nov. 13, 2003

(30) Foreign Application Priority Data

May 7, 2002 (JP) .................................... 2002-131654

(51) Int. Cl.⁷ .................................................. C08K 3/22
(52) U.S. Cl. ..................... 524/430; 523/212; 428/34.7; 524/786; 524/785; 524/435
(58) Field of Search ................. 524/430, 435, 524/786, 785; 523/212; 428/34.7

(56) References Cited

U.S. PATENT DOCUMENTS

| | | |
|---|---|---|
| 3,294,739 A | 12/1966 | Weyenberg |
| 3,334,067 A | 8/1967 | Weyenberg |
| 4,216,140 A | 8/1980 | Simizu |
| 4,822,830 A * | 4/1989 | Adkins ................. 523/203 |
| 5,405,889 A * | 4/1995 | Hatanaka et al. ......... 523/210 |
| 5,543,173 A * | 8/1996 | Horn et al. ............... 427/212 |
| 5,708,076 A * | 1/1998 | Tsuji et al. ............... 524/788 |
| 5,880,199 A * | 3/1999 | Matsushita et al. ......... 524/492 |

FOREIGN PATENT DOCUMENTS

| | | |
|---|---|---|
| JP | 54-90349 | 7/1979 |
| JP | 4-198365 | 7/1992 |
| JP | 5-12528 | 1/1993 |

* cited by examiner

*Primary Examiner*—Margaret G. Moore
(74) *Attorney, Agent, or Firm*—Oblon, Spivak, McClelland, Maier & Neustadt, P.C.

(57) ABSTRACT

A room temperature curable organopolysiloxane composition comprising (A) a diorganopolysiloxane end-capped with a hydroxy or alkoxy group, (B) a silane crosslinker, (C) an aluminum hydroxide powder surface treated with a silane, siloxane or silazane, and (D) a platinum catalyst is shelf stable and smoothly extrudable prior to curing, and cures into a silicone rubber having long-lasting self-extinguishing properties. The composition is best suited as an adhesive to electrical and electronic parts.

16 Claims, No Drawings

ROOM TEMPERATURE CURABLE ORGANOPOLYSILOXANE COMPOSITION AND PART USING THE SAME AS ADHESIVE

This invention relates to a room temperature curable organopolysiloxane composition and more particularly, to a room temperature curable organopolysiloxane composition which is shelf stable and smoothly extrudable prior to curing and cures into a silicone rubber having long-lasting self-extinguishing properties, as well as electrical and electronic parts using the same as an adhesive.

BACKGROUND OF THE INVENTION

On account of many superior properties, room temperature curable organopolysiloxane compositions are used in a wide range of application including civil engineering, building, general industry, and electrical and electronic fields. However, most room temperature curable organopolysiloxane compositions suffer from poor self-extinguishing properties. Attempts have been made to improve the self-extinguishing properties of such compositions by adding and compounding large amounts of extending fillers such as crystalline silica, zinc carbonate, aluminum hydroxide and carbon black, and by adding and compounding platinum or platinum compounds. In either attempt, the self-extinguishing properties achieved thereby are still short. Additionally, these compositions become less effectively workable, and especially have the crucial drawback of difficult extrusion from a container.

To overcome the above-mentioned drawbacks, JP-A 54-90349 proposes a room temperature curable polyorganosiloxane composition loaded with aluminum hydroxide treated with stearic acid or metaphosphoric acid. Similarly, JP-A 4-198365 and JP-A 5-12528 disclose room temperature curable organosiloxane compositions loaded with a mixture of aluminum hydroxide and calcium carbonate. These compositions are still unsatisfactory in shelf stability, workability, and retention of self-extinguishing properties.

SUMMARY OF THE INVENTION

An object of the invention is to provide a room temperature curable organopolysiloxane composition which is shelf stable and smoothly extrudable prior to curing and cures into a silicone rubber having satisfactory, long-lasting self-extinguishing properties, as well as electrical and electronic parts using the same as an adhesive.

It has been found that a room temperature curable organopolysiloxane composition loaded with a specific surface treated aluminum hydroxide powder is not only stable during shelf storage and smoothly extrudable prior to curing, but also cures into a silicone rubber having satisfactory self-extinguishing properties which remain unchanged with the passage of time.

Accordingly, the present invention provides a room temperature curable organopolysiloxane composition comprising (A) 100 parts by weight of a diorganopolysiloxane end-capped with a hydroxy or alkoxy group and having a viscosity of 100 to 500,000 mPa·s at 25° C., (B) 0.1 to 30 parts by weight of a silane compound having at least three hydrolyzable groups each attached to a silicon atom in a molecule or a partial hydrolyzate thereof, (C) 50 to 300 parts by weight of an aluminum hydroxide powder surface treated with at least one compound selected from the group consisting of a silane, siloxane and silazane and having an average particle size of up to 50 μm, and (D) an amount of a platinum catalyst to give 1 to 200 ppm of platinum metal based on the weight of component (A).

For better self-extinguishing properties, the preferred composition further includes (E) 5 to 100 parts by weight of colloidal calcium carbonate and/or (F) 0.1 to 5 parts by weight of an organic compound having a triazole group.

DESCRIPTION OF THE PREFERRED EMBODIMENTS

The main component of the inventive composition is (A) a diorganopolysiloxane end-capped with a hydroxy or alkoxy group and having a viscosity of 100 to 500,000 mPa·s at 25° C. Component (A) should be capped with a hydroxy or alkoxy group at the end of its molecular chain. Typical diorganopoly-siloxanes include α,ω-dihydroxy (or diorganoxy)-diorgano-polysiloxanes of the following general formulae (1) and (2).

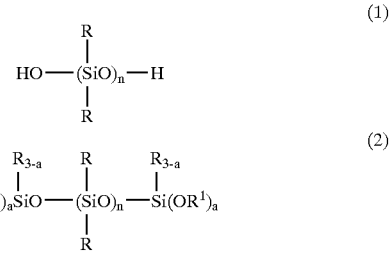

Herein each of R and $R^1$ which may be the same or different is a substituted or unsubstituted monovalent hydrocarbon group, n is such a number that the diorganopolysiloxane of formula (1) or (2) may have a viscosity of 100 to 500,000 mPa·s at 25° C., preferably 500 to 100,000 mPa·s at 25° C., and "a" is 2 or 3.

In formulae (1) and (2), the monovalent hydrocarbon groups represented by R are preferably those of 1 to 12 carbon atoms, especially 1 to 10 carbon atoms, for example, alkyl groups such as methyl, ethyl, isopropyl, hexyl and octadecyl, alkenyl groups such as vinyl and hexenyl, cycloalkyl groups such as cyclohexyl and cyclopentyl, aralkyl groups such as benzyl and β-phenylethyl, aryl groups such as phenyl, xenyl, naphthyl, tolyl and xylyl, and substituted ones of the foregoing groups in which some or all of the hydrogen atoms are substituted with cyano groups or halogen atoms, such as β-cyanoethyl, 3,3,3-trifluoropropyl, and perfluorobutyl. Of these, methyl is most preferred. $R^1$ is a chain-like alkyl group such as methyl, ethyl, isopropyl, hexyl or octadecyl, with methyl and ethyl being preferred.

Each of R and $R^1$ may be the same at each occurrence while a mixture of different groups is acceptable. For ease of synthesis and a balance between mechanical properties after curing and a viscosity of an uncured composition, it is preferred that at least 90 mol %, especially all of R be methyl, and the group other than methyl, if included, be vinyl or phenyl.

The viscosity at 25° C. of the diorganopolysiloxane is in the range of 100 to 500,000 mPa·s, preferably 500 to 100,000 mPa·s. Below 100 mPa·s, the cured rubber has too low an elongation below the practically acceptable level. Above 500,000 mPa·s, the composition becomes difficult to extrude.

Component (B) is a silane compound having at least three hydrolyzable groups each attached to a silicon atom in a molecule or a partial hydrolyzate thereof, which serves as a crosslinking agent in the inventive composition.

Typical silane compounds have the following general formula (3).

$$R^2_b SiX_{4-b} \quad (3)$$

Herein $R^2$ is a substituted or unsubstituted monovalent hydrocarbon group as defined for R, preferably $C_{1-3}$ alkyl, vinyl or phenyl. X is a hydrolyzable group, for example, alkoxy, alkenyloxy, ketoxime, acetoxy, amino, amide, or aminoxy, with alkoxyl, alkenyloxy and ketoxime being preferred. The subscript b is 0 or 1.

Examples of the silane compounds or partial hydrolyzates thereof include alkoxysilanes such as tetramethoxysilane, tetraethoxysilane, methyltrimethoxysilane, ethyltrimethoxysilane, vinyltrimethoxysilane, 3,3,3-trifluoropropyltrimethoxysilane, β-cyanoethyltrimethoxysilane, tetraisopropoxysilane, tetrabutoxysilane, phenyltrimethoxysilane, octadecyltrimethoxysilane, tetra(β-chloroethoxy)silane, tetra(2,2,2-trifluoroethoxy)silane, propyltris(δ-chlorobutoxy)silane, and methyltris(methoxyethoxy)silane; alkoxysiloxanes such as ethylpolysilicate and dimethyltetramethoxydisiloxane; ketoximesilanes such as methyltris(methyl ethyl ketoxime)silane, vinyltris(methyl ethyl ketoxime)silane, phenyltris (methyl ethyl ketoxime) silane, methyl (diethyl ketoxime)silane, and tetra(methyl ethyl ketoxime)silane; aminosilanes such as methyltris (cyclohexylamino)silane and vinyltris(n-butylamino)silane; amidesilanes such as methyltris(N-methylacetamide)silane, methyltris(N-butylacetamide)silane, and methyltris(N-cyclohexylacetamide)silane; aminoxysilanes such as methyltris(N,N-diethylaminoxy)silane; alkenoxysilanes such as methyltri(isopropenoxy)silane and vinyltri (isopropenoxy)silane; and acetoxysilanes such as methyltriacetoxysilane and vinyltriacetoxysilane. They may be used alone or in admixture.

Component (B) is added in an amount of 0.1 to 30 parts by weight per 100 parts by weight of component (A). The amount of component (B) added depends on whether the room temperature curable organopolysiloxane composition of the invention is a one package composition or a two package composition, and the water content of the composition. Then an appropriate amount of component (B) may be determined in accordance with these factors.

Component (C) is an aluminum hydroxide powder surface treated with at least one compound selected from the group consisting of a silane, siloxane and silazane and having an average particle size of up to 50 μm, which is essential to endow the inventive composition with self-extinguishing properties and an ability to retain the properties. If an aluminum hydroxide powder surface treated with a compound other than silanes, siloxanes and silazanes or an untreated aluminum hydroxide powder is used, the self-extinguishing properties after curing in a fresh state or following long-term storage change with the passage of time.

The compound for surface treatment is selected from the group consisting of silanes, siloxanes, silazanes and mixtures thereof. Examples of suitable silane compounds include alkoxysilanes such as tetramethoxysilane, tetraethoxysilane, methyltrimethoxysilane, ethyltrimethoxysilane, vinyltrimethoxysilane, 3,3,3-trifluoropropyltrimethoxysilane, β-cyanoethyltrimethoxysilane, tetraisopropoxysilane, tetrabutoxysilane, phenyltrimethoxysilane, octadecyltrimethoxysilane, tetra(β-chloroethoxy)silane, tetra(2,2,2-trifluoroethoxy)silane, propyltris(δ-chlorobutoxy)silane, and methyltris(methoxyethoxy)silane; and organochlorosilanes such as dimethyldichlorosilane and methyltrichlorosilane. An exemplary siloxane compound is octaamethylcyclotetrasiloxane. An exemplary silazane compound is hexamethyldisilazane. Of these, preference is given to silane compounds, more preferably alkoxysilanes having a $C_{1-3}$ alkoxy group, and most preferably organotrialkoxysilanes having the following general formula (4):

$$R^3 SiY_3 \quad (4)$$

wherein $R^3$ is a monovalent $C_{1-10}$ hydrocarbon group and Y is a $C_{1-3}$ alkoxy group.

The aluminum hydroxide powder (C) should have an average particle size of up to 50 μm, preferably 0.5 to 50 μm, more preferably 1 to 40 μm. With an average particle size in excess of 50 μm, self-extinguishing properties become poor and the rubber after curing has poor physical properties.

Component (C) is added in an amount of 50 to 300 parts by weight, preferably 60 to 200 parts by weight per 100 parts by weight of component (A). Less than 50 parts of component (C) fails to impart sufficient self-extinguishing properties whereas more than 300 parts of component (C) interferes with extrusion.

Component (D) is a platinum catalyst which is essential for endowing the inventive composition with self-extinguishing properties. Suitable platinum catalysts include platinum fines, a platinum powder supported on a suitable carrier such as alumina, silica gel or asbestos, chloroplatinic acid, and complexes of chloroplatinic acid with alcohols, ethers, aldehydes or vinylsiloxanes. To assist in dispersing the platinum catalyst (platinum or platinum compound) in the composition, the platinum catalyst may be dissolved or dispersed in an organic solvent (e.g., isopropanol, ethanol, benzene, toluene or xylene) or organopolysiloxane oil prior to use.

Component (D) is added in an amount of 1 to 200 ppm, preferably 10 to 100 ppm, calculated as platinum metal based on the weight of component (A). Less than 1 ppm of component (D) fails to impart self-extinguishing properties whereas more than 200 ppm of component (D) achieves no further improvement in self-extinguishing properties and is thus uneconomical.

Component (E) is colloidal calcium carbonate which is optional, but effective for improving extrudability and imparting appropriate rubber physical properties. In general, calcium carbonate includes heavy calcium carbonate, light calcium carbonate and colloidal calcium carbonate. For the inventive composition, colloidal calcium carbonate having the smallest particle size is preferred among other species. Calcium carbonate may be surface treated or not although calcium carbonate treated with fatty acids, resin acids or surfactants is preferred.

Component (E) is added in an amount of 5 to 100 parts by weight, preferably 10 to 100 parts by weight, more preferably 20 to 50 parts by weight per 100 parts by weight of component (A). More than 100 parts of component (E) may interfere with extrusion.

Component (F) is an organic compound having a triazole group, which is optional, but effective for endowing the composition with more self-extinguishing properties. Examples of the organic compound having a triazole group include benzotriazole and derivatives thereof such as siloxane-modified benzotriazole.

Component (F) is added in an amount of 0.1 to 5 parts by weight per 100 parts by weight of component (A). Less than 0.1 part of component (F) is less effective whereas more than 5 parts may fail to achieve a further improvement in self-extinguishing properties.

In the inventive composition, a catalyst for promoting the curing of component (A) with component (B) is included if necessary. Typical catalysts include tetramethylguanidylpropyltrimethoxysilane, tetramethylguanidylpropyldimethoxysilane, dibutyllead(II) ethyloctoate, dibutyltin diacetate, dibutyltin(II) ethylhexoate, dibutyltin dilaurate, butyltin tri-2-ethylhexoate, dibutyltin acetylacetonate, iron(II) ethylhexoate, cobalt(II) ethylhexoate, manganese(II) ethylhexoate, metal salts of monocarboxylic acids such as stannous caprylate, tin naphthenate, tin oleate, butyltin, zinc naphthenate, zinc stearate, and titanium naphthenate; tetrabutyl titanate, tetraphenyl titanate, tetra-2-ethylhexyl titanate, tetraoctadecyl titanate, triethanolamine titanate and ethylene glycol titanate; organosiloxy titanium compounds having an organosiloxy group attached to a titanium atom through Si—O—Ti as disclosed in U.S. Pat. No. 3,294,739; β-dicarbonyl titanium compounds as disclosed in U.S. Pat. No. 3,334,067; amines such as hexylamine and dodecylamine; amine salts such as hexylamine acetate and dodecylamine phosphate; quaternary ammonium salts such as benzyl trimethylammonium acetate; and alkali metal salts such as potassium acetate.

The cure-promoting catalyst is preferably added in an amount of 0.001 to 10 parts by weight, especially 0.01 to 5 parts by weight per 100 parts by weight of component (A).

The inventive composition is prepared by combining essential components (A), (B), (C) and (D), optionally components (E) and (F), and further optionally the cure-promoting catalyst, and compounding these components. Insofar as the objects of the invention are not impaired, there may be further included various organic solvents, non-reactive low molecular weight organopolysiloxane, various fillers (e.g., magnesium oxide, alumina, zinc oxide, and iron oxide), pigments, flame retardants (e.g., manganese carbonate and azobisisobutyronitrile), heat stabilizers (e.g., cerium hydroxide and cerium oxide), adhesion improvers such as silane coupling agents, and other well-known additives which are ordinarily incorporated in room temperature curable organopolysiloxane compositions.

The organopolysiloxane composition thus obtained is stable during shelf storage and smoothly extrudable prior to curing and cures into a silicone rubber having improved self-extinguishing properties which remain unchanged with the passage of time. The composition then finds a wide variety of application, and is desirably used as an adhesive in electrical and electronic parts having a potential danger of heat generation or ignition, especially as an adhesive between a cathode ray tube (CRT) and a resin.

EXAMPLE

Examples of the invention are given below by way of illustration and not by way of limitation. All parts are by weight. The viscosity is a measurement at 25° C.

Various properties were measured by the following tests.
Extrusion:
After a plastic cartridge was filled with a room temperature curable organopolysiloxane composition, the composition was extruded therefrom under a pressure of 2 kg/cm² during which time a rate of discharge (g/sec) was measured.
Rubber Physical Properties:
A room temperature curable organopolysiloxane composition was cured for 7 days at room temperature into a silicone rubber sheet of 2 mm thick. Physical properties (hardness, tensile strength and elongation) of this silicone rubber sheet were measured according to JIS K6249.
Self-Extinguishing Properties (Flame Retardance):
The test is in accord with the flame retardance test of UL-94. A room temperature curable organopolysiloxane composition was cured into a silicone rubber sheet of 0.8 mm thick, which was cut into a strip of 127 mm long and 12.7 mm wide. The test strip was vertically suspended in windless air, and ignited from below twice for 10 seconds each with a flame of a gas burner of 1000 BTU/ft³, and the time (sec) passed until the flame extinguished was measured each time. On five test strips, the ignition test was conducted two times. The total (sec) of extinguishing times of ten tests was used as an index of self-extinguishing property.

Example 1

At room temperature, 100 parts of α,ω-dihydroxy-dimethylpolysiloxane having a viscosity of 20,000 mPa·s was successively combined with 100 parts of an aluminum hydroxide fine powder surface treated with ethyltrimethoxysilane and having an average particle size of 10 μm and an amount of a 2-ethylhexanol solution of chloroplatinic acid to give 22 ppm of platinum metal based on the dimethylpolysiloxane. The ingredients were mixed in vacuum until uniform.

To 100 parts of the mixture were added 6 parts of vinyltrimethoxysilane and 0.5 part of tetramethylguanidylpropyltrimethoxysilane. The ingredients were mixed in vacuum until uniform. 0.3 part of dibutyltin dilaurate was added to the mixture, which was mixed in moisture-shielded conditions until uniform. This was admitted into a plastic cartridge which was sealed.

The one package room temperature curable organopolysiloxane composition thus obtained was tested for extrusion, fluidity, rubber physical properties (hardness, tensile strength and elongation) after curing, and self-extinguishing properties (1 week after curing of a fresh composition, 3 months after curing of a fresh composition, and 1 week after curing of an aged composition which had been stored for 3 months in the uncured state). The results are shown in Table 1.

Example 2

At room temperature, 100 parts of α,ω-dihydroxy-dimethylpolysiloxane having a viscosity of 20,000 mPa·s was successively combined with 100 parts of an aluminum hydroxide fine powder surface treated with vinyltrimethoxysilane and having an average particle size of 1.0 μm and an amount of a 2-ethylhexanol solution of chloroplatinic acid to give 22 ppm of platinum metal based on the dimethylpolysiloxane. The ingredients were mixed in vacuum until uniform.

To 100 parts of the mixture were added 6 parts of vinyltrimethoxysilane and 0.5 part of tetramethylguanidylpropyltrimethoxysilane. The ingredients were mixed in vacuum until uniform. 0.3 part of dibutyltin dilaurate was added to the mixture, which was mixed in moisture-shielded conditions until uniform. This was admitted into a plastic cartridge which was sealed.

The one package room temperature curable organopolysiloxane composition thus obtained was tested for extrusion, fluidity, rubber physical properties, and self-extinguishing properties as in Example 1. The results are shown in Table 1.

Comparative Example 1

A one package room temperature curable organopolysiloxane composition was prepared as in Example 1 except that an aluminum hydroxide fine powder surface treated with fatty acid was used instead of the aluminum hydroxide fine powder treated with ethyltrimethoxysilane. The composition was tested for extrusion, fluidity, rubber physical properties, and self-extinguishing properties as in Example 1. The results are shown in Table 1.

Comparative Example 2

A one package room temperature curable organopolysiloxane composition was prepared as in Example 1 except that an aluminum hydroxide fine powder surface treated with stearic acid was used instead of the aluminum hydroxide fine powder treated with ethyltrimethoxysilane. The composition was tested for extrusion, fluidity, rubber physical properties, and self-extinguishing properties as in Example 1. The results are shown in Table 1.

Comparative Example 3

At room temperature, 100 parts of α,ω-dihydroxydimethylpolysiloxane having a viscosity of 20,000 mPa·s was successively combined with 80 parts of an aluminum hydroxide fine powder surface treated with stearic acid and having an average particle size of 10 μm, 20 parts of surface-treated colloidal calcium carbonate having an average particle size of 10 μm, and an amount of a 2-ethylhexanol solution of chloroplatinic acid to give 22 ppm of platinum metal based on the dimethylpolysiloxane. The ingredients were mixed in vacuum until uniform.

To 100 parts of the mixture were added 7.0 parts of vinyltrimethoxysilane and 0.5 part of tetramethylguanidylpropyltrimethoxysilane. The ingredients were mixed in vacuum until uniform. 0.3 part of dibutyltin dilaurate was added to the mixture, which was mixed in moisture-shielded conditions until uniform, yielding a one package room temperature curable organopolysiloxane composition. This was admitted into a plastic cartridge which was sealed.

The one package room temperature curable organopolysiloxane composition was tested for extrusion, fluidity, rubber physical properties, and self-extinguishing properties as in Example 1. The results are shown in Table 1.

TABLE 1

|  |  | Example | | Comparative Example | | |
|---|---|---|---|---|---|---|
|  |  | 1 | 2 | 1 | 2 | 3 |
| Discharge rate (g/s) | | 25 | 26 | 20 | 21 | 19 |
| Hardness (Durometer A) | | 50 | 51 | 55 | 52 | 55 |
| Elongation at break (%) | | 150 | 120 | 100 | 110 | 140 |
| Tensile strength (MPa) | | 2.0 | 2.0 | 2.1 | 2.2 | 2.3 |
| UL-94 flame retardance (0.8 mm gage) | 1 week after cure | V-0 | V-0 | V-0 | V-0 | V-0 |
| | 3 months after cure | V-0 | V-0 | burned | burned | burned |
| | 1 week after curing of 3-month aged composition | V-0 | V-0 | burned | burned | burned |

Example 3

At room temperature, 100 parts of α,ω-dihydroxydimethylpolysiloxane having a viscosity of 20,000 mPa·s was successively combined with 86 parts of an aluminum hydroxide fine powder surface treated with ethyltrimethoxysilane and having an average particle size of 10 μm and an amount of a 2-ethylhexanol solution of chloroplatinic acid to give 22 ppm of platinum metal based on the dimethylpolysiloxane. The ingredients were mixed in vacuum until uniform.

To 100 parts of the mixture were added 4.0 parts of vinyltrimethoxysilane and 1.0 part of diisopropoxy-bis(ethyl acetoacetate)titanium. The ingredients were mixed in moisture-shielded conditions until uniform. This was admitted into a plastic cartridge which was sealed.

The one package room temperature curable organopolysiloxane composition thus obtained was tested for extrusion, fluidity, rubber physical properties, and self-extinguishing properties as in Example 1. The results are shown in Table 2.

Example 4

At room temperature, 100 parts of α,ω-dihydroxydimethylpolysiloxane having a viscosity of 20,000 mPa·s was successively combined with 86 parts of an aluminum hydroxide fine powder surface treated with ethyltrimethoxysilane and having an average particle size of 10 μm and an amount of a 2-ethylhexanol solution of chloroplatinic acid to give 22 ppm of platinum metal based on the dimethylpolysiloxane. The ingredients were mixed in vacuum until uniform.

The mixture, 100 parts, was mixed with 4.0 parts of vinyltri(isopropenoxy)silane and 0.5 part of tetramethylguanidylpropyltrimethoxysilane in moisture-shielded conditions until uniform. This was admitted into a plastic cartridge which was sealed.

The one package room temperature curable organopolysiloxane composition thus obtained was tested for extrusion, fluidity, rubber physical properties, and self-extinguishing properties as in Example 1. The results are shown in Table 2.

Example 5

At room temperature, 100 parts of α,ω-dihydroxydimethylpolysiloxane having a viscosity of 20,000 mPa·s was successively combined with 86 parts of an aluminum hydroxide fine powder surface treated with ethyltrimethoxysilane and having an average particle size of 10 μm and an amount of a 2-ethylhexanol solution of chloroplatinic acid to give 22 ppm of platinum metal based on the dimethylpolysiloxane. The ingredients were mixed in vacuum until uniform.

The mixture, 100 parts, was mixed with 6 parts of vinyltris(methyl ethyl ketoxime)silane and 0.1 part of dibutyltin dilaurate in moisture-shielded conditions until uniform. This was admitted into a plastic cartridge which was sealed.

The one package room temperature curable organopolysiloxane composition thus obtained was tested for extrusion, fluidity, rubber physical properties, and self-extinguishing properties as in Example 1. The results are shown in Table 2.

Example 6

At room temperature, 100 parts of α,ω-dihydroxydimethylpolysiloxane having a viscosity of 20,000 mPa·s was successively combined with 86 parts of an aluminum hydroxide fine powder surface treated with ethyltrimethoxysilane and having an average particle size of 10 μm, 29 parts of a fatty acid-treated calcium carbonate powder, 29 parts of a crystalline silica powder and an amount of a 2-ethylhexanol solution of chloroplatinic acid to give 22 ppm of platinum metal based on the dimethylpolysiloxane. The ingredients were mixed in vacuum until uniform.

The mixture, 100 parts, was mixed with 4.0 parts of vinyltrimethoxysilane and 1.0 part of diisopropoxy-bis(ethyl acetoacetate)titanium in moisture-shielded conditions until uniform. This was admitted into a plastic cartridge which was sealed.

The one package room temperature curable organopolysiloxane composition thus obtained was tested for extrusion, fluidity, rubber physical properties, and self-extinguishing properties as in Example 1. The results are shown in Table 2.

Example 7

At room temperature, 100 parts of α,ω-dihydroxydimethylpolysiloxane having a viscosity of 20,000 mPa·s was successively combined with 86 parts of an aluminum hydroxide fine powder surface treated with ethyltrimethoxysilane and having an average particle size of 10 μm, 3 parts of benzotriazole, and an amount of a 2-ethylhexanol solution of chloroplatinic acid to give 22 ppm of platinum metal based on the dimethylpolysiloxane. The ingredients were mixed in vacuum until uniform.

The mixture, 100 parts, was mixed with 4.0 parts of vinyltrimethoxysilane and 1.0 part of diisopropoxy-bis(ethyl acetoacetate)titanium in moisture-shielded conditions until uniform. This was admitted into a plastic cartridge which was sealed.

The one package room temperature curable organopolysiloxane composition thus obtained was tested for extrusion, fluidity, rubber physical properties, and self-extinguishing properties as in Example 1. The results are shown in Table 2.

TABLE 2

| | | Example | | | | |
|---|---|---|---|---|---|---|
| | | 3 | 4 | 5 | 6 | 7 |
| Discharge rate (g/s) | | 26 | 30 | 23 | 20 | 26 |
| Hardness (Durometer A) | | 49 | 51 | 46 | 60 | 50 |
| Elongation at break (%) | | 160 | 110 | 120 | 80 | 130 |
| Tensile strength (MPa) | | 1.5 | 2.0 | 2.1 | 2.5 | 1.8 |
| UL-94 flame retardance (0.8 mm gage) | 1 week after cure | V-0 | V-0 | V-0 | V-0 | V-0 |
| | 3 months after cure | V-0 | V-0 | V-0 | V-0 | V-0 |
| | 1 week after curing of 3-month aged composition | V-0 | V-0 | V-0 | V-0 | V-0 |

There has been described a room temperature curable organopolysiloxane composition loaded with silane, siloxane or silazane-treated aluminum hydroxide particles which is stable during shelf storage and smoothly extrudable prior to curing, and cures into a silicone rubber having satisfactory self-extinguishing properties which remain unchanged with the passage of time. The composition is best suited as an adhesive to electrical and electronic parts, especially cathode ray tubes (CRT).

Japanese Patent Application No. 2002-131654 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A room temperature curable organopolysiloxane composition comprising
   (A) 100 parts by weight of a diorganopolysiloxane end-capped with a hydroxy or alkoxy group and having a viscosity of 100 to 500,000 mPa·s at 25° C.,
   (B) 0.1 to 30 parts by weight of a silane compound having the following general formula (3):

$$R^2{}_b SiX_{4-b} \quad (3)$$

wherein $R^2$ is $C_{1-3}$ alkyl, vinyl, or phenyl, X is alkoxyl, alkenyloxy or ketoxime group, and b is 0 or 1, or a partial hydrolyzate thereof as a crosslinking agent,
   (C) 50 to 300 parts by weight of an aluminum hydroxide powder surface treated with at least one compound having the general formula (4):

$$R^3 SiY_3 \quad (4)$$

wherein $R^3$ is an ethyl group and Y is a $C_{1-3}$ alkoxy group, and having an average particle size of up to 50 μm, and
   (D) platinum or a platinum compound in an amount of 1 to 200 ppm calculated as platinum metal based on the weight of component (A).

2. The composition of claim 1, further comprising (E) 5 to 100 parts by weight of colloidal calcium carbonate.

3. The composition of claim 1, further comprising (F) 0.1 to 5 parts by weight of an organic compound having a triazole group.

4. An electrical or electronic part using as an adhesive the room temperature curable organopolysiloxane composition of claim 1.

5. The electrical or electronic part of claim 4 which is a cathode ray tube.

6. The composition of claim 1 wherein X in formula (3) is an alkoxyl group.

7. An electronic part, comprising:
   a cathode ray tube;
   a resin; and
   as an adhesive between the cathode ray tube and the resin, a room temperature curable organopolysiloxane composition comprising the composition of claim 1.

8. The composition according to claim 1, wherein said diorganopolysiloxane is represented by formula (1):

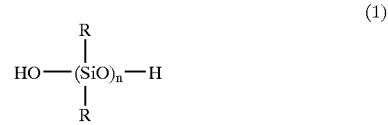

(1)

wherein
   each of R and $R^1$ may be the same or different and may be a substitute or unsubstituted monovalent hydrocarbon group, and
   n is such a number that the diorganopolysiloxane of formula (1) has a viscosity of 100 to 500,000 mPa·s at 25° C.

9. The composition according to claim 1, wherein said diorganopolysiloxane is represented by formula (2):

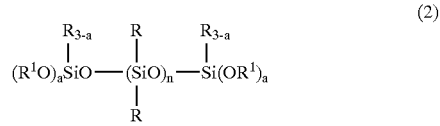

(2)

wherein
   each of R and $R^1$ may be the same or different and may be a substitute or unsubstituted monovalent hydrocarbon group,
   n is such a number that the diorganopolysiloxane of formula (1) has a viscosity of 100 to 500,000 mPa·s at 25° C., and
   a is 2 or 3.

10. The composition according to claim 8, wherein at least 90 mol % of R are methyl and the remaining R are vinyl or phenyl.

11. The composition according to claim 8, wherein all R are methyl.

12. The composition according to claim 9, wherein at least 90 mol % of R are methyl and the remaining R are vinyl or phenyl.

13. The composition according to claim 9, wherein all R are methyl.

14. An adhesive comprising the composition according to claim 1.

15. A silicone rubber obtained by curing the composition according to claim 1.

16. The composition of claim 1, wherein the compound of formula (4) is ethyl trimethoxysilane.

* * * * *